United States Patent
Shin et al.

(10) Patent No.: US 12,037,066 B2
(45) Date of Patent: Jul. 16, 2024

(54) METHOD FOR PROVIDING FEEDBACK REGARDING MOBILITY OPERATING

(71) Applicants: HYUNDAI MOTOR COMPANY, Seoul (KR); Kia Corporation, Seoul (KR)

(72) Inventors: Hyeon Sik Shin, Hwaseong-si (KR); Jun Hwan Park, Seoul (KR); Seok Ryung Kwon, Seoul (KR); Pan Keun Baek, Osan-si (KR); Joo Young Chun, Seoul (KR); Hun Keon Ko, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 374 days.

(21) Appl. No.: 17/517,133

(22) Filed: Nov. 2, 2021

(65) Prior Publication Data
US 2022/0363312 A1 Nov. 17, 2022

(30) Foreign Application Priority Data
Apr. 30, 2021 (KR) .......................... 10-2021-0056259

(51) Int. Cl.
| | |
|---|---|
| B62D 6/00 | (2006.01) |
| B62D 1/10 | (2006.01) |
| B62D 1/16 | (2006.01) |
| B62D 5/00 | (2006.01) |
| B62D 5/04 | (2006.01) |
| B62D 6/10 | (2006.01) |
| B62D 15/02 | (2006.01) |

(52) U.S. Cl.
CPC ............. B62D 6/10 (2013.01); B62D 5/0481 (2013.01); B62D 6/008 (2013.01)

(58) Field of Classification Search
None
See application file for complete search history.

(56) References Cited

U.S. PATENT DOCUMENTS

| | | | |
|---|---|---|---|
| 2020/0062292 A1 | 2/2020 | Shin | |
| 2020/0326665 A1* | 10/2020 | Fujiwara | ................. H02P 23/20 |
| 2022/0041210 A1* | 2/2022 | Sakaguchi | ......... B62D 15/0215 |
| 2022/0396305 A1* | 12/2022 | Yang | ...................... B62D 1/166 |
| 2023/0347972 A1* | 11/2023 | Sakayori | ............... B62D 6/008 |

FOREIGN PATENT DOCUMENTS

KR 10-2020-0023807 A 3/2020

* cited by examiner

*Primary Examiner* — Jonathan M Dager
*Assistant Examiner* — Laura E Linhardt
(74) *Attorney, Agent, or Firm* — MORGAN, LEWIS & BOCKIUS LLP

(57) ABSTRACT

A mobility system includes a mobility module that measures and controls a mobility state of the mobility system and an operation module that receives a movement input of the mobility system. The operation module is configured to identify the mobility state through the mobility module, measure a force or torque depending on the movement input, calculate a restoring torque satisfying a critical velocity or a critical acceleration, based on the mobility state and the measured force or torque, and provide feedback on the movement input depending on the determined restoring torque.

14 Claims, 7 Drawing Sheets

METHOD FOR PROVIDING FEEDBACK REGARDING MOBILITY OPERATING

CROSS-REFERENCE TO RELATED APPLICATION

This application claims the benefit of priority to Korean Patent Application No. 10-2021-0056259, filed on Apr. 30, 2021 with the Korean Intellectual Property Office, the entire contents of which are incorporated herein by reference.

TECHNICAL FIELD

The present disclosure relates to a technology for providing feedback on mobility operation.

BACKGROUND

A means of transportation, such as a vehicle, may move through steering, driving, and braking functions. The vehicle may move forward and backward through an accelerator pedal, or may make a turn through a steering wheel. However, in recent years, omni-directional mobility technology for enabling not only forward and backward movement and turning but also horizontal movement has been being developed.

The information disclosed in the Background section above is to aid in the understanding of the background of the present disclosure, and should not be taken as acknowledgement that this information forms any part of prior art.

SUMMARY

In a case of a general vehicle, a restoring force is generated based on vibration from the ground, tire alignment, or a geometric shape of a steering system. Furthermore, a steering input device is connected in hardware with tires and the steering system, and therefore a user operating the vehicle may directly feel movement of the tires and the steering system. However, in the case of the omni-directional mobility technology, a vehicle has independent four-wheel driving/steering systems, and therefore the driving system and the steering system cannot be connected with a steering input device. Accordingly, when an operation input occurs irrespective of a mobility state of the vehicle, instability in a mobility motion may increase.

The present disclosure has been made to solve the above-mentioned problems occurring in the prior art while advantages achieved by the prior art are maintained intact.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a mobility system includes a mobility module that measures and controls a mobility state of the mobility system and an operation module that receives a movement input of the mobility system. The operation module is configured to identify the mobility state through the mobility module, measure a force or torque depending on the movement input, calculate a restoring torque satisfying a critical velocity or a critical acceleration, based on the mobility state and the measured force or torque, and provide feedback on the movement input depending on the determined restoring torque.

According to another aspect of the present disclosure, a method for operating a mobility system includes receiving a movement input, identifying a mobility state, measuring a force or torque depending on the movement input, calculating a restoring torque satisfying a critical velocity or a critical acceleration, based on the mobility state and the measured force or torque, and providing feedback on the movement input, based on the determined restoring torque.

According to another aspect of the present disclosure, provided is a computer-readable non-transitory recording medium having programs stored therein for receiving a movement input, identifying a mobility state, measuring a force or torque depending on the movement input, calculating a restoring torque satisfying a critical velocity or a critical acceleration, based on the mobility state and the measured force or torque, and providing feedback on the movement input depending on the determined restoring torque.

BRIEF DESCRIPTION OF THE DRAWINGS

The above and other objects, features and advantages of the present disclosure will be more apparent from the following detailed description taken in conjunction with the accompanying drawings.

With regard to description of the drawings, identical or similar reference numerals may be used to refer to identical or similar components.

DETAILED DESCRIPTION

Figure 1:
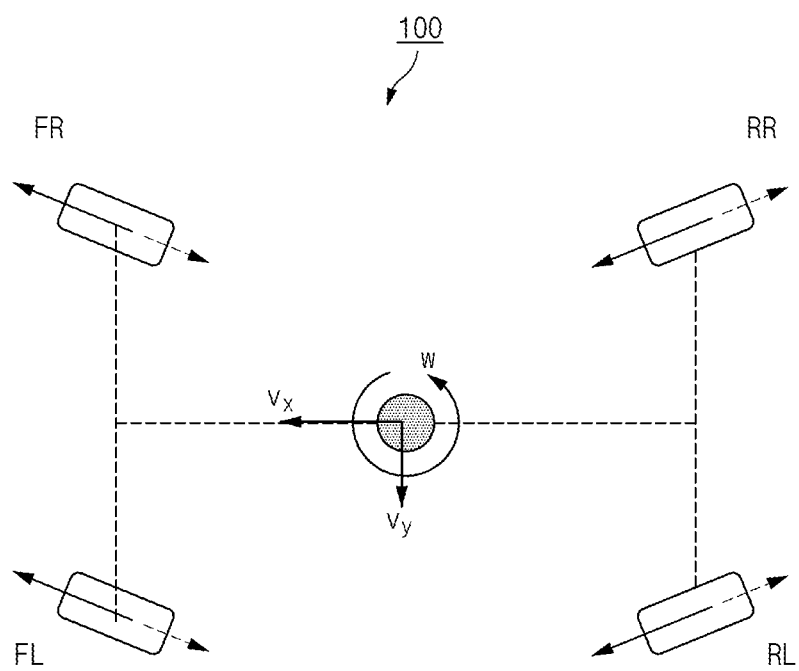
FIG. 1 illustrates a mobility system supporting an independent steering function according to various exemplary embodiments.

Hereinafter, various exemplary embodiments of the present disclosure may be described with reference to accompanying drawings. Accordingly, those of ordinary skill in the art will recognize that modification, equivalent, and/or alternative on the various exemplary embodiments described herein can be variously made without departing from the scope and spirit of the present disclosure.

It should be appreciated that various exemplary embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine. For example, the machine may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various exemplary embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates a mobility system supporting an independent steering function according to various exemplary embodiments.

Referring to FIG. 1, the mobility system 100 may support an independent four-wheel (FR, FL, RR, and RL) steering function and may adjust the attitude angle of a vehicle body to a desired angle. For example, in a coordinate system with the center of gravity (CG) as an origin, a general vehicle may perform only a linear motion in the x-axis direction and a rotary motion about the z-axis, but the mobility system 100 may additionally support a linear motion in the y-axis direction. Accordingly, the mobility system 100 may control an x-axis velocity, a y-axis velocity, and a z-axis rotational velocity. The mobility system 100 may include a steering input device, such as a joystick, to enable a user to control movement in the y-axis direction.

A tire steering system and a steering wheel may be connected through hardware, and therefore the steering wheel may move depending on reaction forces of the ground transmitted to tires and the current directions of the tires. In contrast, in the mobility system 100 that supports omni-directional movement, the steering input device and a tire steering system may be independent of each other, and therefore synchronization between the directions of tires and the steering input device may be required.

Figure 2:
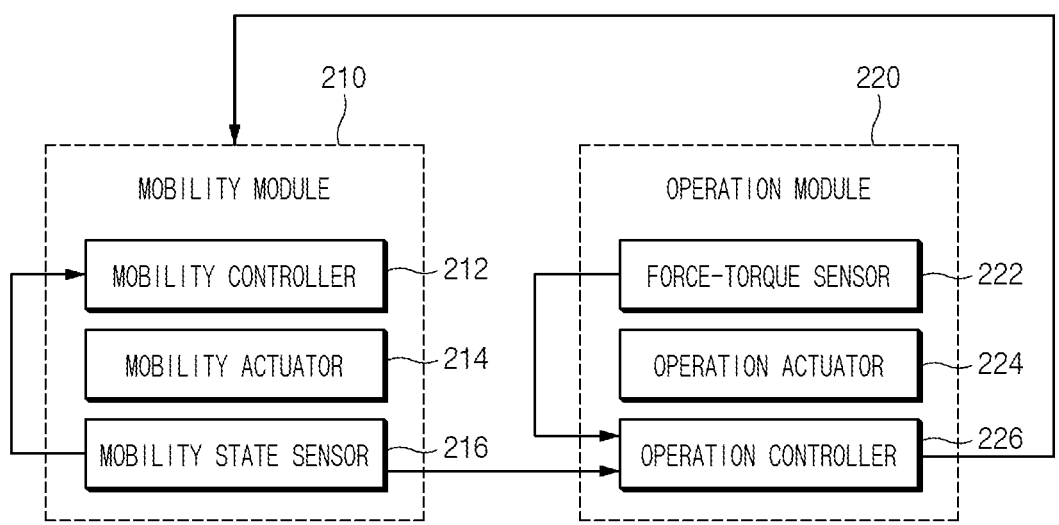
FIG. 2 illustrates a block diagram of the mobility system according to various exemplary embodiments.

FIG. 2 illustrates a block diagram of the mobility system according to various exemplary embodiments.

Referring to FIG. 2, the mobility system 100 may include a mobility module 210 and an operation module 220. For convenience of description, components included in the mobility system 100 may be classified as the mobility module 210 or the operation module 220. However, the components are not physically divided according to the embodiment illustrated in FIG. 2. The components may be arranged in connection with one another. Some of the components illustrated in FIG. 2 may be implemented by hardware, and the other components may be implemented by software.

The mobility module 210 of the mobility system 100 according to one exemplary embodiment may include a mobility controller 212 that can control movement of a vehicle including the mobility system 100 depending on a movement input received through the operation module 220. For example, the mobility controller 212 may calculate a steering angle of a tire, based on at least one of a velocity, a rotational velocity, or acceleration. The mobility controller 212 may control movement of the vehicle by the calculated steering angle using a mobility actuator 214. One embodiment of control logic by the mobility controller 212 will be described below with reference to FIG. 3.

A mobility state sensor 216 may sense the current mobility state of the vehicle. The mobility state may represent the velocity or acceleration of the vehicle or the steering angle of each tire (or, wheel). The mobility state sensor 216 may transfer information about the current mobility state to an operation controller 226 of the operation module 220.

The operation module 220 of the mobility system 100 according to one exemplary embodiment may include a force-torque sensor 222 that can measure a degree represented by a user's movement input for the operation module 220 (or, the steering input device) as a force or torque.

The operation module 220 may further include the operation controller 226 that can calculate a control margin using the current mobility state and may provide feedback on the movement input, based on the movement input sensed through the force-torque sensor 222 and the control margin. The control margin may represent a margin of the current mobility state with regard to a preset critical mobility state (e.g., velocity, acceleration, or rotational velocity). For example, the operation controller 226 may set a critical velocity for each displacement and may calculate a velocity margin through the set critical velocity and the current velocity. The velocity margin may be expressed as the elastic modulus of an elastic member (e.g., a torsion spring) included in the operation module 220. The operation controller 226 may calculate a restoring torque by applying the elastic modulus to a difference between maximum displacement of a control included in the operation module 220 and displacement depending on user operation. The operation controller 226 may provide feedback on the current mobility state to the user by applying a force corresponding to the restoring torque to an operation actuator 224. In an embodiment, the operation controller 226 may provide a warning to the user through vibration by applying a specified frequency (e.g., 10 Hz to 100 Hz) to the operation actuator 224.

According to one exemplary embodiment, the mobility controller 212 and the operation controller 226 may be implemented with a hardware processor to perform the functions described in the present disclosure.

Figure 3:
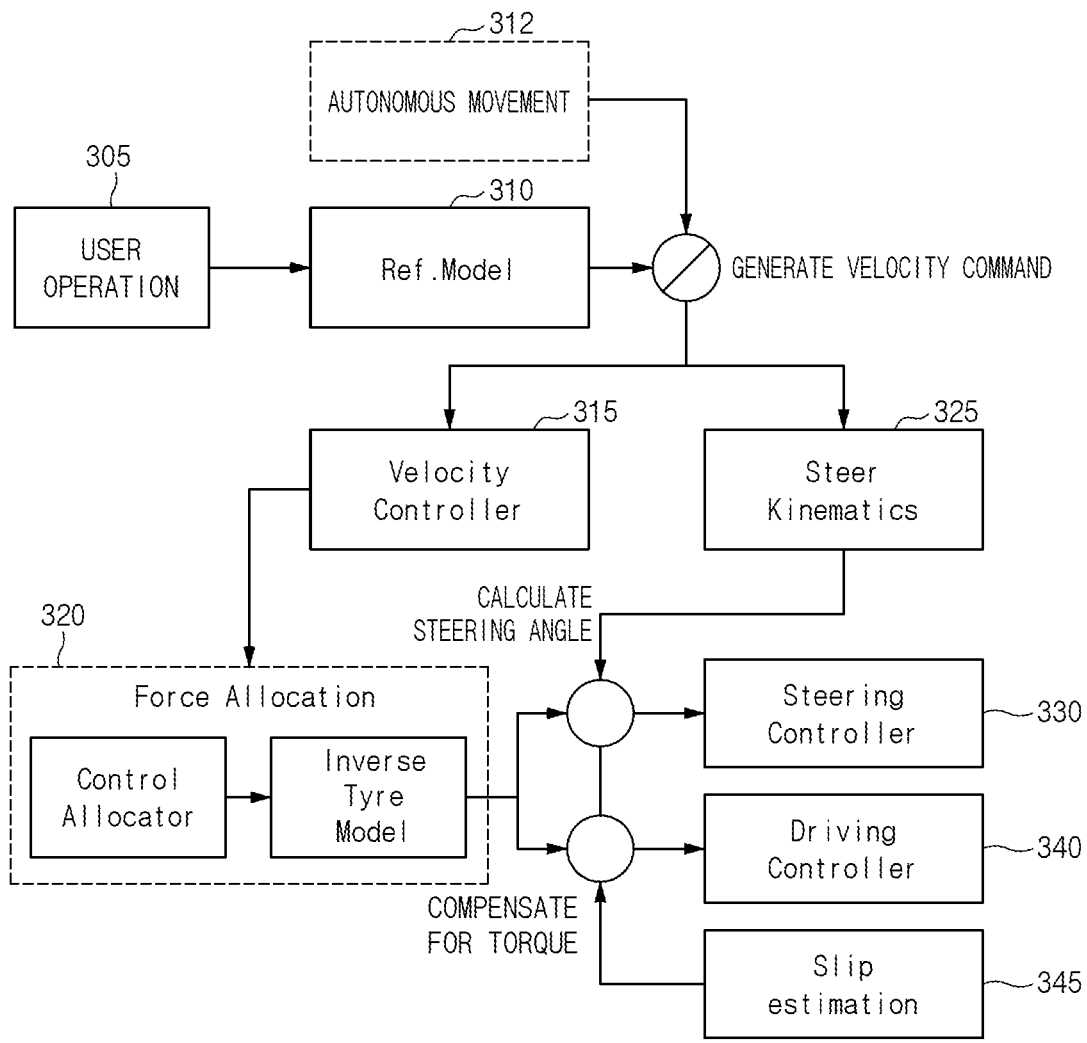
FIG. 3 illustrates control logic of a mobility controller according to various exemplary embodiments.

FIG. 3 illustrates control logic of the mobility controller according to various exemplary embodiments.

Referring to FIG. 3, the mobility controller 212 may generate a velocity command from user operation 305 or an input 312 according to an autonomous movement algorithm. When the user operation 305 is input, the mobility controller 212 may generate the velocity command from the user operation 305 through a degree-of-freedom reference model 310 (e.g., a planar three degree-of-freedom reference model). The mobility controller 212 may calculate a force required for a tire by using the velocity command and a velocity controller 315. For example, the mobility controller 212 may calculate a lateral force for each tire in a force allocation device 320 and may calculate a steering angle compensation value by applying the calculated value to an inverse tire model. The mobility controller 212 may calculate a steering angle for four wheels by using the velocity command and steer kinematics 325 and may determine the final steering angle by using the steering angle and the steering angle compensation value in a steering controller 330. The mobility controller 212 may estimate tire slip by using a driving controller 340 and a slip estimation device 345 and may compensate for torque through the estimated value such that the tire does not deviate from a specified range.

Figure 4:
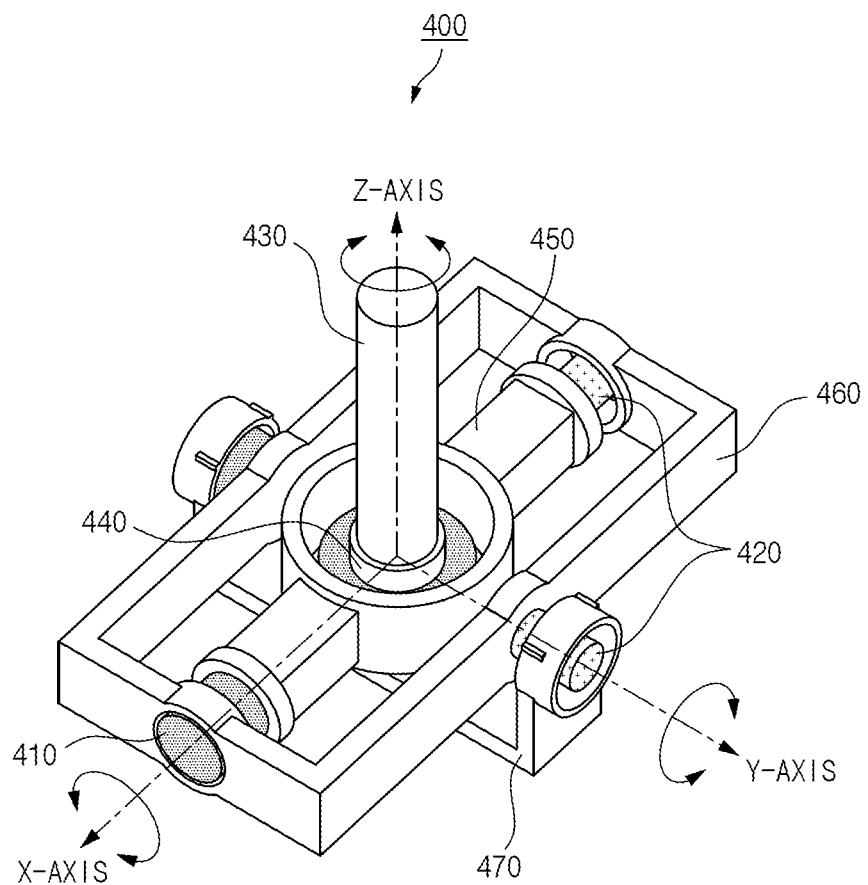
FIG. 4 illustrates a structure of an operation module according to various exemplary embodiments.

FIG. 4 illustrates a structure of an operation module according to various exemplary embodiments.

Referring to FIG. 4, the operation module 400 (e.g., 220 of FIG. 2) may include a handle 430 such that a user controls an x-axis velocity, a y-axis velocity, and a z-axis rotational velocity. The handle 430 may have, for example, a cylindrical shape, but is not limited thereto.

The operation module 400 may include a force-torque sensor 440 at a lower end of the handle 430 to measure a movement input (input moment) of the user received through the handle 430. The force-torque sensor 440 may be disposed at the intersection point of three axes of rotation (x-axis, y-axis, and z-axis).

The operation module 400 may calculate a control margin for a user input measured through the force-torque sensor 440 and may include actuators 410 to provide feedback depending on the control margin to the user. The actuators 410 may be mounted on a lower end of the force-torque sensor 440, a first link 450, a second link 460, and a third link 470. The actuators mounted on the respective links may be separately implemented, or may be integrated into one device. The actuator (or, a part of the actuators 410) mounted on the lower end of the force-torque sensor 440 may induce rotation of the mobility system 100 and rotation of the handle 430 through a z-axis rotary motion. The actuator (or, a part of the actuators 410) mounted on the first link 450 may induce a y-axis motion of the mobility system 100 through x-axis rotation. The actuator (or, a part of the actuators 410) mounted on the second link 460 may induce an x-axis motion of the mobility system 100 through y-axis rotation. The actuator (or, a part of the actuators 410) mounted on the third link 470 may be fixed to the third link 470. In an embodiment, the operation module 400 may transfer a warning to the user by outputting vibration with a specified frequency (e.g., 10 Hz to 100 Hz) through the actuators 410. For example, the operation module 400 may transfer a warning to the user through vibration when vehicle slippage, power limit, or an error of a control algorithm deviates from a specified range.

The operation module 400 may include an elastic member 420 to supplement torque outputs of the actuators 410 or secure elasticity. The elastic member 420 may include a torsion spring. One portion of the elastic member 420 may be fixed to the x-axis together with the actuator mounted on the first link 450, and another portion of the elastic member 420 may be fixed to the y-axis together with the actuator mounted on the second link 460.

Figure 5:
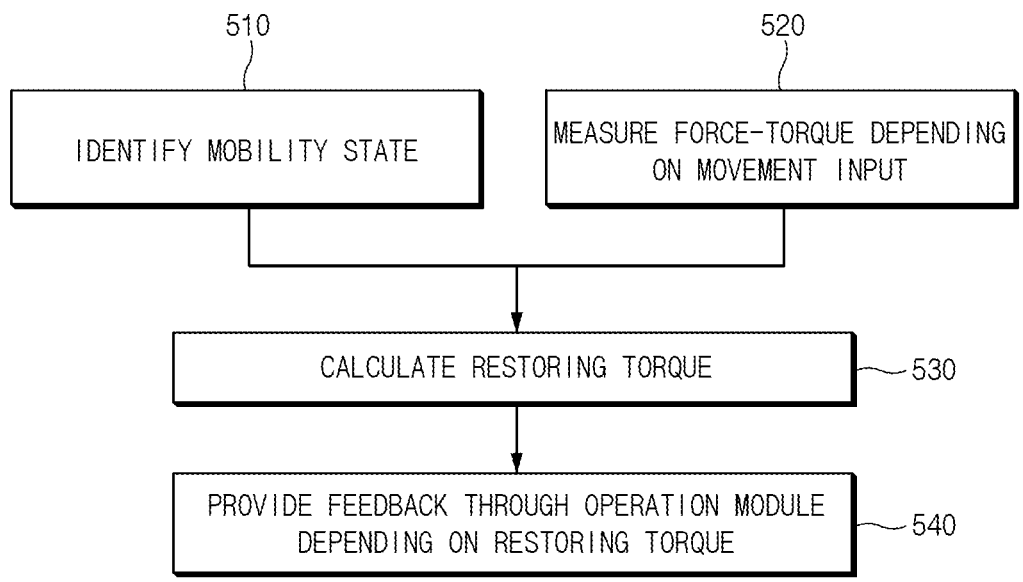
FIG. 5 illustrates an operation flowchart of the mobility system providing feedback according to various exemplary embodiments.

FIG. 5 illustrates an operation flowchart of the mobility system providing feedback according to various exemplary embodiments. Operations illustrated in FIGS. 5 and 6 may be implemented by the mobility system 100, or may be implemented by a component (e.g., the operation module 220 or the operation controller 226) of the mobility system 100.

Referring to FIG. 5, the mobility system 100 may identify a mobility state in operation 510 and may measure force-torque depending on a movement input in operation 520. The mobility state may be expressed as displacement of an actuator (e.g., 410 of FIG. 4). The mobility state and the force-torque may be expressed for motion components in a coordinate system.

In operation 530, the mobility system 100 may calculate a restoring torque, based on the mobility state and the force-torque. The restoring torque may be calculated based on a velocity (or, acceleration) and a rotational velocity that represent the mobility state, and the elastic modulus of an elastic member (e.g., 420 of FIG. 4). For example, the mobility system 100 may calculate a control margin of the movement input depending on the current mobility state and may calculate the restoring torque as a reaction force by applying the elastic modulus to the calculated value.

In operation 540, the mobility system 100 may provide feedback through the operation module 220 depending on the calculated restoring torque. When a torque corresponding to the calculated restoring torque is applied to the actuator of the operation module 220, a user may feel the current mobility state. In an embodiment, the mobility system 100 may transfer a warning to the user by outputting vibration through the operation module 220 when the restoring torque deviates from a threshold value.

Figure 6:
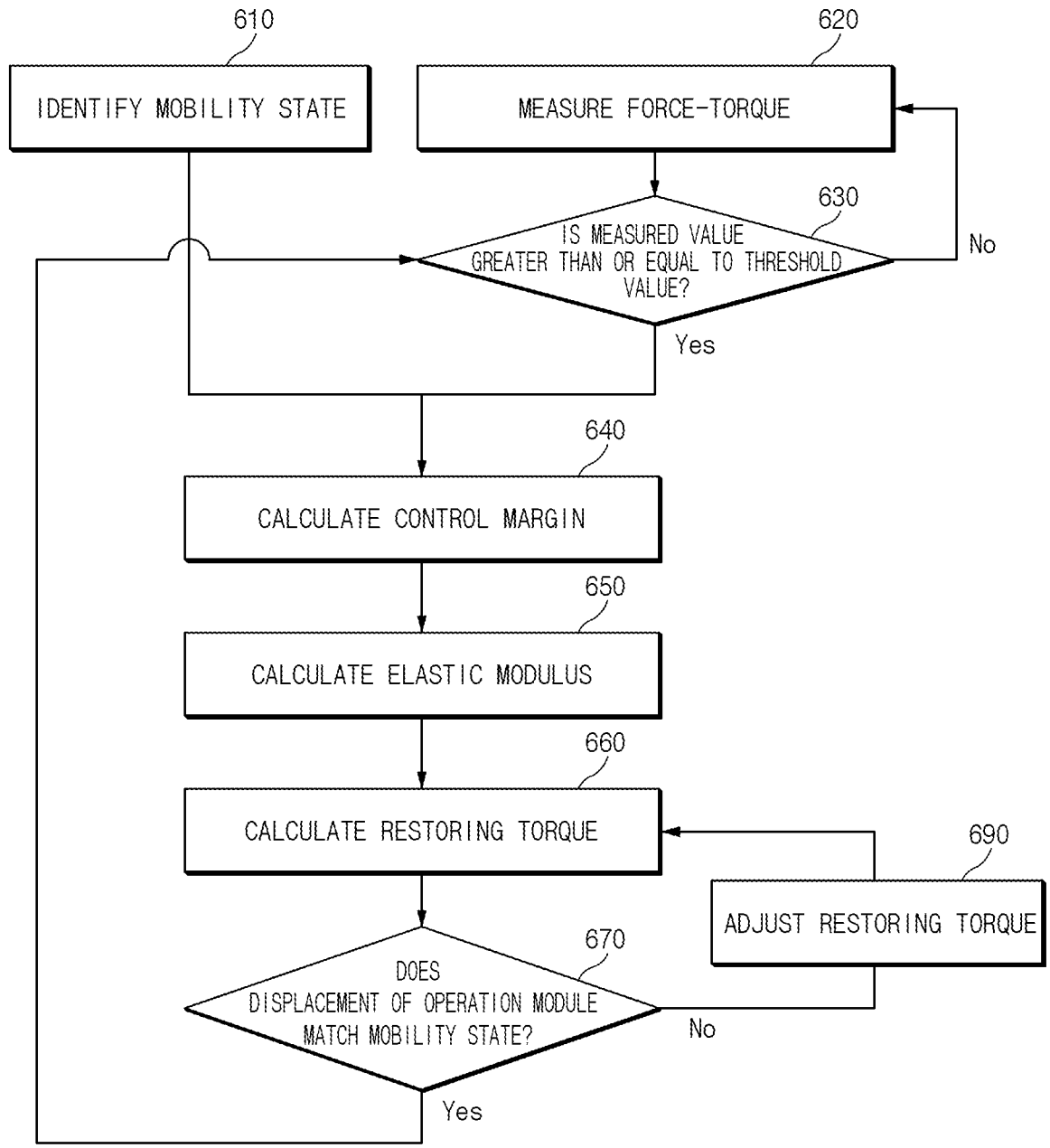
FIG. 6 illustrates another operation flowchart of the mobility system providing feedback according to various exemplary embodiments.

FIG. 6 illustrates another operation flowchart of the mobility system providing feedback according to various exemplary embodiments.

Referring to FIG. 6, the mobility system 100 may identify a mobility state in operation 610 and may measure force-torque in operation 620. In operation 630, the mobility system 100 may determine whether the measured force-torque is greater than or equal to a threshold value. When the measured value is less than the threshold value, the mobility system 100 may repeat operation 620.

When the measured value is greater than or equal to the threshold value, the mobility system 100 may, in operation 640, calculate a control margin using the mobility state and the force-torque. For example, the control margin may be expressed as a difference between a preset critical velocity (or, a critical acceleration or a critical rotational velocity) and the current velocity (or, acceleration or rotational velocity) represented by the mobility state.

In operation 650, the mobility system 100 may calculate the elasticity (or, elastic modulus) of a restoring torque elasticity model for providing a reaction force depending on the calculated control margin. In operation 660, the mobility system 100 may calculate a restoring torque, based on the calculated elastic modulus. In operation 670, the mobility system 100 may determine whether displacement of the operation module 220 to which the calculated restoring torque is applied matches the current mobility state. When the displacement of the operation module 220 does not match the mobility state, the mobility system 100 may adjust the restoring torque to match the displacement of the operation module 220 and the mobility state. When the displacement of the operation module 220 matches the mobility state, the mobility system 100 may repeat operations 630 to 670 depending on a user's movement input received thereafter.

Figure 7:
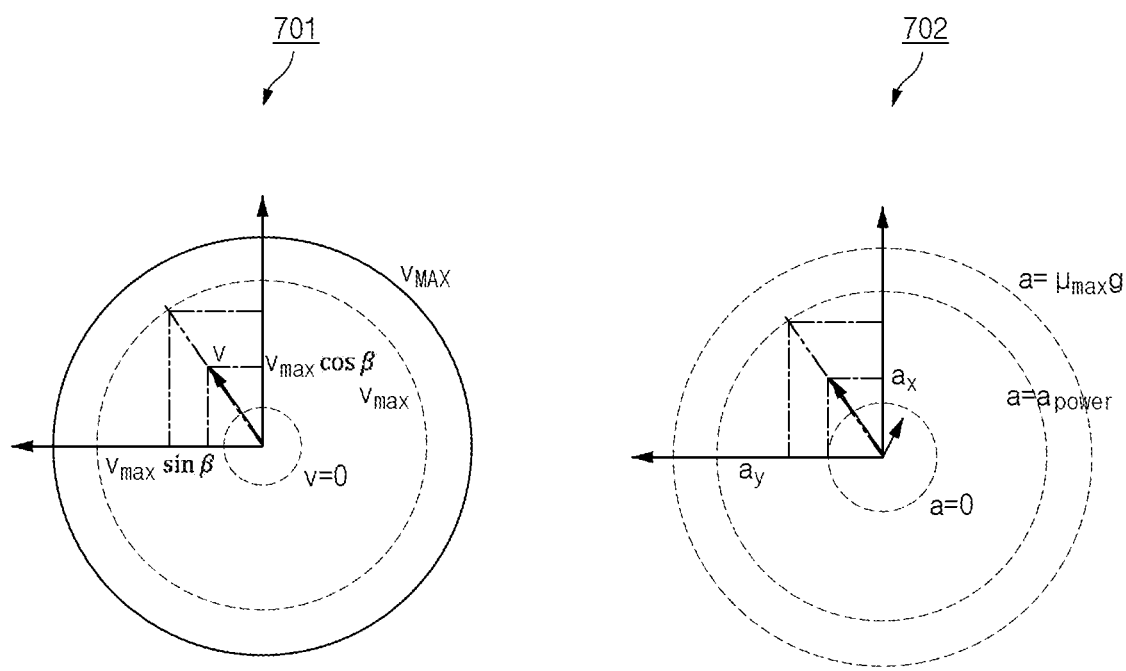
FIG. 7 illustrates an operation of calculating a restoring torque based on a critical velocity or a critical acceleration according to various exemplary embodiments.

FIG. 7 illustrates an operation of calculating a restoring torque based on a critical velocity or a critical acceleration according to various exemplary embodiments.

Referring to FIG. 7, reference numeral 701 may represent an embodiment of calculating a restoring torque based on a velocity. In FIG. 7, it is assumed that the current mobility state has $v_x$, $v_y$, and w. Rotational displacement of each axis may represent the current velocity. The mobility system 100 may set a critical velocity $v_{max}$ according to Equation 1 below.

$$\sqrt{v_x^2 + v_y^2} = v < v_{max}, \quad \text{[Equation 1]}$$

$$\text{where } v_{max} = \min\left(v_{MAX}, \frac{\mu g}{|\omega + \dot{\beta}|}\right)$$

$v_{MAX}$ may represent a maximum linear velocity, $\mu g$ may represent a friction limit, and $\dot{\beta}$ may represent a posture conversion rate of $v_x$ with respect to $v_y$. The mobility system 100 may compare the maximum linear velocity and a value obtained by dividing the friction limit by the sum of the rotational velocity and the posture conversion rate and may set the critical velocity $v_{max}$ to a smaller value.

The mobility system 100 may set critical velocities for respective motion components in a reference coordinate system according to Equation 2 below.

$$v_{x,max} = v_{max} \cos \beta, v_{y,max} = v_{max} \sin \beta \quad \text{[Equation 2]}$$

$\beta$ may represent an angle for a direction in which a vehicle faces at present.

The mobility system 100 may calculate elastic moduli for the respective motion components using the calculated critical velocities and the current velocities according to Equation 3 below.

$$k_x = k_{vx}\left|\frac{v_{x,max}}{v_{x,max} - v_x}\right|, k_y = k_{vy}\left|\frac{v_{y,max}}{v_{y,max} - v_y}\right| \quad \text{[Equation 3]}$$

$k_{vx}$ and $k_{vy}$ may represent default elastic moduli for a velocity model.

The mobility system 100 may calculate restoring torques to be applied to an actuator, based on displacements that a received movement input represents and the current velocities according to Equation 4.

$$\tau_y = k_x(\theta_{vx} - \theta'_{vx}) + k_{xi}\theta_{vx}, \tau_x = k_y(\theta_{vy} - \theta'_{vy}) + k_{yi}\theta_{vy} \quad \text{[Equation 4]}$$

$k_{xi}$ and $k_{yi}$ may represent spring constants of an elastic member (e.g., 420 of FIG. 4). The restoring torques may be applied to the elastic member based on a rotational displacement of 0. The restoring torques $\tau_x$ and $\tau_y$ may be determined by a combination of the actuator and the elastic member. $\theta_{vx}$ and $\theta_{vy}$ may represent velocities in respective directions when a maximum rotational displacement is set to $v_{max}$, and $\theta'_{vx}$ and $\theta'_{vy}$ may represent displacements by which an operation module (or, a handle) is moved by user operation (a movement input). To allow the vehicle to maintain a constant velocity, the elastic member connected with the actuator may maintain a predetermined angle with respect to an input force of the user. When the operation module (or, the handle) returns to the original point, a control margin may increase, and therefore elasticity may have directionality.

In a case of controlling a rotational velocity, the mobility system 100 may assume that a change of linear velocity components is substantially small, may set a critical rotational velocity $w_{max}$ using accelerations $a_x$ and $a_y$ measured through a force-torque sensor, and may calculate a restoring torque $\tau_z$ using the set critical rotational velocity and the current rotational velocity $\theta_w$. The critical rotational velocity and the restoring torque may be calculated by Equation 5 and Equation 6, respectively.

$$(w_{max} + \dot{\beta})^2 < \frac{\mu g}{v^2}, \quad \text{[Equation 5]}$$

$$\text{where } \dot{\beta} = -w + \frac{1}{v}(-a_x \sin\beta + a_y \cos\beta)$$

$$\tau_z = k_z\theta_w, \text{ where } k_z = k_{wz}\left|\frac{w_{max}}{w_{max} - w}\right| \quad \text{[Equation 6]}$$

Reference numeral 702 may represent an embodiment of calculating a restoring torque based on acceleration. When the current velocities and acceleration are $v_x$, $v_y$, and w, accelerations of the respective motion components may be calculated according to Equation 7 below.

$$a_x = \dot{v}_x - wv_y, a_y = \dot{v}_y + wv_x \quad \text{[Equation 7]}$$

Critical accelerations $a_{x,max}$ and $a_{y,max}$ in the respective directions may be calculated according to a friction limit $\mu_{max}g$ and Equation 8, and elastic moduli $k_x$ and $k_y$ may be calculated according to the calculated critical accelerations and Equation 9.

$$\sqrt{a_{x,max}^2 + a_{y,max}^2} < \mu_{max} g \qquad \text{[Equation 8]}$$

$$a_{x,max} = \sqrt{(\mu_{max} g)^2 - a_y^2}$$

$$a_{y,max} = \sqrt{(\mu_{max} g)^2 - a_x^2}$$

$$k_x = k_{ax} \left| \frac{a_{x,max} + a_{xi}}{a_{x,max} - a_x} \right|, k_y = k_{ay} \left| \frac{a_{y,max} + a_{yi}}{a_{y,max} - a_y} \right| \qquad \text{[Equation 9]}$$

$a_{xi}$ and $a_{yi}$ may be values for preventing a phenomenon in which there is no change in elasticity because the critical accelerations $a_{x,max}$ and $a_{y,max}$ are excessively small when the vehicle performs a maximum acceleration motion in one direction.

Restoring torques may be calculated according to the calculated elastic moduli and Equation 10.

$$\tau_y = k_x(\theta_{ax} - \theta'_{ax}) + k_{xi}\theta_{ax}, \tau_x = k_y(\theta_{ay} - \theta'_{ay}) + k_{yi}\theta_{ay} \qquad \text{[Equation 10]}$$

According to an embodiment, acceleration may be limited by limitation of power in addition to the critical accelerations. For example, the mobility system 100 may set the critical accelerations using power instead of the friction limit as in Equation 11, when Power ($w_1$, $w_2$, $w_3$, $w_4$), which is the sum of powers of a motor for respective wheel velocities $w_2$, $w_3$, and $w_4$, is less than a specified threshold value.

$$\sqrt{a_{x,max}^2 + a_{y,max}^2} < \frac{\text{Power}(w_1, w_2, w_3, w_4)}{v\left(m + \frac{I}{R_{turn}^2}\right)} \qquad \text{[Equation 11]}$$

m may represent mass, I may represent rotational moment of inertia, and $R_{turn}$ may represent a turning radius.

According to the embodiments of the present disclosure, the mobility system may provide feedback to a device for operating mobility or a user, thereby operating mobility within a stable range.

Furthermore, according to the embodiments of the present disclosure, the mobility system may provide an output with a specific frequency through an actuator, thereby providing warning feedback to a user.

In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A mobility system comprising:
 a mobility module configured to measure and control a mobility state of the mobility system; and
 an operation module configured to receive a movement input of the mobility system,
 wherein the operation module is further configured to:
 identify the mobility state through the mobility module;
 measure a force or torque depending on the movement input;
 calculate a control margin satisfying a critical velocity, based on an x-axis velocity, a y-axis velocity, and a z-axis rotational velocity represented by the mobility state and the measured force or torque, or calculate the control margin satisfying a critical acceleration, based on an x-axis acceleration, a y-axis acceleration, and the z-axis rotational velocity represented by the mobility state and the measured force or torque;
 calculate a restoring torque, based on the control margin satisfying the critical velocity or the critical acceleration; and
 provide feedback on the movement input depending on the determined restoring torque.

2. The mobility system of claim 1, wherein the operation module is further configured to:
 determine whether the measured force or torque is greater than or equal to a threshold value;
 calculate the restoring torque, when the measured force or torque is greater than or equal to the threshold value; and
 repeat the measuring of the force or torque depending on the movement input, when the measured force or torque is less than the threshold value.

3. The mobility system of claim 1, wherein the operation module is further configured to:
 calculate an elastic modulus, based on the control margin; and
 calculate the restoring torque, based on the elastic modulus.

4. The mobility system of claim 1, wherein the operation module is further configured to:
 calculate an elastic modulus, based on the control margin; and
 calculate the restoring torque, based on the elastic modulus.

5. The mobility system of claim 1, wherein the operation module is further configured to:
 determine whether a displacement of the operation module to which the feedback is applied matches the mobility state; and
 adjust the restoring torque, when the displacement of the operation module does not match the mobility state.

6. The mobility system of claim 1, wherein the operation module includes:
 a handle;
 a sensor connected with the handle and configured to measure the force or torque; and
 an actuator connected with the handle or the sensor and configured to induce a rotary motion.

7. The mobility system of claim 6, wherein the operation module further includes an elastic member disposed on a same axis together with the actuator.

8. The mobility system of claim 6, wherein the operation module is further configured to output vibration with a specified frequency by controlling the actuator.

9. A method for operating a mobility system, the method comprising:
 receiving a movement input;
 identifying a mobility state;
 measuring a force or torque depending on the movement input;
 calculating a restoring torque based on a control margin satisfying a critical velocity or a critical acceleration; and
 providing feedback on the movement input, based on the determined restoring torque,
 wherein the calculating of the restoring torque includes:
 calculating the control margin satisfying the critical velocity, based on an x-axis velocity, a y-axis velocity, and a z-axis rotational velocity represented by the mobility state and the measured force or torque; or
 calculating the control margin the critical acceleration, based on an x-axis acceleration, a y-axis acceleration, and the z-axis rotational velocity represented by the mobility state and the measured force or torque.

10. The method of claim 9, further comprising:
determining whether the measured force or torque is greater than or equal to a threshold value;
calculating the restoring torque, when the measured force or torque is greater than or equal to the threshold value; and
repeating the measuring of the force or torque depending on the movement input, when the measured force or torque is less than the threshold value.

11. The method of claim 9, wherein the calculating of the restoring torque includes:
calculating an elastic modulus, based on the control margin; and
calculating the restoring torque, based on the elastic modulus.

12. The method of claim 9, wherein the calculating of the restoring torque includes:
calculating an elastic modulus, based on the control margin; and
calculating the restoring torque, based on the elastic modulus.

13. The method of claim 9, further comprising:
determining whether a displacement of an operation module to which the feedback is applied matches the mobility state; and
adjusting the restoring torque, when the displacement of the operation module does not match the mobility state.

14. A computer-readable non-transitory recording medium having programs stored therein for:
receiving a movement input;
identifying a mobility state;
measuring a force or torque depending on the movement input;
calculating a restoring torque based on a control margin satisfying a critical velocity or a critical acceleration; and
providing feedback on the movement input depending on the determined restoring torque,
wherein the calculating of the restoring torque includes:
calculating the control margin satisfying the critical velocity, based on an x-axis velocity, a y-axis velocity, and a z-axis rotational velocity represented by the mobility state and the measured force or torque; or
calculating the control margin satisfying the critical acceleration, based on an x-axis acceleration, a y-axis acceleration, and the z-axis rotational velocity represented by the mobility state and the measured force or torque.

* * * * *